United States Patent Office 3,595,931
Patented July 27, 1971

---

3,595,931
HYDROGENOLYSIS OF AROMATIC HALIDES
Russell G. Hay, Gibsonia, and John G. McNulty and William L. Walsh, Glenshaw, Pa., assignors to Gulf Research & Development Company, Pittsburgh, Pa.
No Drawing. Filed May 28, 1968, Ser. No. 732,549
Int. Cl. C07c *15/02*
U.S. Cl. 260—668                                     11 Claims

ABSTRACT OF THE DISCLOSURE

A process is provided for the replacement of a halogen moiety on a halogenated aromatic with a hydrogen. The process involves contacting the halogenated aromatic in the vapor phase in the presence of hydrogen with a supported catalyst containing a minor amount of Pt or Pd and a minor amount of a hydrated alkali or alkaline earth metal oxide such as KOH.

---

This invention relates to the hydrogenolysis of aromatic halides and in particular to the use of improved catalysts for this reaction.

Hydrogenolysis is the replacement of a functional group, such as a halogen, on a hydrocarbon, such as an aromatic ring, with hydrogen. The hydrogenolysis of halogenated alkanes occurs quite readily, but the hydrogenolysis of aromatic halides is a more difficult reaction, for a halogen directly attached to an aromatic nucleus forms one of the most stable compounds known. The use of palladium or platinum deposited on a carrier such as alumina was found to be effective for the hydrogenolysis of halogenated aromatics to aromatic hydrocarbons in the presence of hydrogen; however, the selectivity of the reaction was not as high as desired and the aging characteristics of the catalysts were poor due to coke deposition causing frequent and undesirable regenerations. It has now been found that the platinum and palladium catalysts can be greatly improved for the hydrogenolysis of aromatic halides by treating the catalyst with a hydrated alkali or alkaline earth metal oxide.

In accordance with the invention, a process is provided for the hydrogenolysis of aromatic halides which comprises contacting the halogenated aromatic in the vapor phase in the added presence of molecular hydrogen with a catalyst comprising a minor amount of a hydrated alkali or alkaline earth metal oxide and a minor amount of a noble metal selected from the group consisting of platinum or palladium supported on a carrier.

The hydrogenolysis produces a gaseous hydrogen halide as a by-product. It was expected that the hydrated alkali or alkaline earth metal oxide would react with the gaseous hydrogen halide produced in the process and be consumed and that little lasting benefits would be obtained. It has been found quite unexpectedly that when the hydrated alkali or alkaline earth metal oxide is present on the catalyst in minor or small amounts, it is apparently not consumed but in some unknown manner remains with the support and confers desirable properties on the catalyst such as improved selectivity and increased operating time between regeneration by the production of little coke.

The charge stock for the process of this invention can be any halogenated aromatic compound. The halogenated aromatic component can suitably have between one and six halogen atoms, usually between one and two, and can have from one to two aromatic rings which can be either condensed or noncondensed. The preferred halogenated aromatic compounds are those containing only carbon, hydrogen and halogen and are more preferably the single ring aromatic compounds having the formula given below.

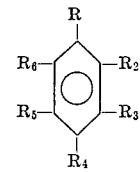

where $R_1$, $R_2$, $R_3$, $R_4$, $R_5$ and $R_6$ can be the same or different and are selected from the group consisting of hydrogen, halogen and saturated alkyl groups having from one to ten carbon atoms, preferably one to four carbon atoms, and wherein at least one of the R groups is a halogen. Preferably, no more than three of the R groups are halogen. By halogen is meant F, Cl, Br or I.

Examples of suitable halogenated aromatics which can be used in the process of this invention and which are not meant to be limiting include: chlorobenzene; dichlorobenzene; 1-chloro-3-bromobenzene; tetrachlorobenzene; fluorobenzene; trichlorobenzene; iodobenzene; meta-chlorotoluene; para-bromotoluene; 1-ethyl-3-chlorobenzene; 1-octyl-4-bromobenzene; 1-decyl-3-chlorobenzene; 1,3-dimethyl-2-chlorobenzene; 1,2 - dimethyl-3-chlorobenzene; alpha-chloronaphthalene; bromobenzene; 1-chloro-2,5-dimethylbenzene; 1-chloro-2,4-dimethylbenzene; 1-chloro-3,5-dimethylbenzene; 1-chloro-3,4-dimethylbenzene; ortho-chlorotoluene; para-chlorotoluene; and beta-chloronaphthalene.

Using chlorobenzene simply as a typical illustrative example, it is reacted in the vapor phase with hydrogen to produce benzene and dry HCl as shown in the equation below:

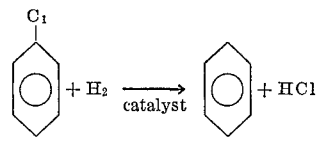

The catalyst to employ in the reaction comprises a minor amount of a hydrated alkali or alkaline earth metal oxide and a minor amount of palladium or platinum supported on a carrier such as alumina or silica or mixtures thereof. The preferred hydrated alkali and alkaline earth metal oxides can be represented by the formula $Me(OH)_y$ where Me can be lithium, sodium, potassium, cesium, rubidium, calcium, strontium or barium, and $y$ is the valence of Me. The amount of the alkali metal hydroxide to employ is suitably between 0.25 and ten weight percent of the catalyst, with preferred amounts between two and seven weight percent of the catalyst. Amounts of the alkali metal hydroxide in excess of about ten weight percent results in reaction of the alkali metal hydroxide with the produced hydrogen halide, resulting in reduced yields of the recovered hydrogen halide with no concomitant benefits to the selectivity or life of the catalyst.

The amount of the palladium or platinum metal is suitably between 0.1 and ten weight percent of the catalyst, and is preferably between 0.4 and two weight percent. The higher amounts of the palladium or platinum can be employed but serve to give no additional benefits and are thus economically unfeasible. The most preferred amount of the palladium or platinum metal is between 0.4 and one percent by weight of the catalyst.

The catalyst support comprises any of the usual catalyst support materials such as alumina, silica, magnesia or mixtures thereof including silica-aluminas. The preferred supports are those containing silica, alumina or mixtures of silica and alumina. Either naturally occurring or man-made catalyst support materials can be employed. The preferred support materials are those aluminas, silica-aluminas, etc. which are readily commercially available. Desirably, the supports have a large surface area, for example, between 50 and 500 square meters per gram, and preferably have a surface area between 200 and 500 square meters per gram.

The platinum or palladium and the alkali metal hydroxide can be added to the alumina containing support by any suitable procedure. For example, the platinum or palladium may be distended on the carrier by any conventional method as, for example, impregnation, co-precipitation, and the like. For example, the alumina containing support may be immersed in a dilute aqueous solution of palladium chloride or chloroplatinic acid, then drained and dried and reduced with hydrogen to form the free metal. The hydrated alkali or alkaline earth metal oxide can be added either before or after the addition of the palladium or platinum but is preferably added after the deposition of the platinum or palladium. One suitable method of adding the hydrated alkali or alkaline earth metal oxide is to add it in the form of the alkali or alkaline earth metal hydroxide by the method of incipient wetness whereby a sufficient amount of the alkali or alkaline earth metal hydroxide is added in aqueous solution to the catalyst so that upon drying, the desired weight percent of the hydrated alkali or alkaline earth metal oxide remains behind on the surfaces of the catalyst. Although the metal is deposited as the hydroxide as a matter of convenience, the metal may form a complex such as a different hydrated metal oxide either physically or chemically combined with the alumina containing base.

The reaction is usually carried out by vaporizing the halogenated aromatic charge stock and passing it upflow or downflow together with hydrogen through a bed of a supported platinum or palladium containing catalyst as described. The reaction temperature can suitably be between 175° C. and 450° C., is usually between 200° C. and 325° C., and is preferably between 225° C. and 300° C. Atmospheric pressure can suitably be employed, but low pressures on the order of several atmospheres to 100 p.s.i.g. or higher can also be utilized. The lower temperatures and higher pressures, however, tend to favor saturation of the aromatic ring which is, of course, undesired.

The amount of hydrogen to employ will be a function of the amount of halogen to be removed from the charge stock. One mole of hydrogen is required for each mole equivalent of halogenated aromatic. It, of course, requires one mole of hydrogen for every atom of halogen attached to an aromatic ring. Thus, a mole ratio of hydrogen to chlorobenzene of 1:1 is the same as a mole equivalent ratio of 1:1. A mole ratio of hydrogen to dichlorobenzene of 1:1 results in a mole equivalent ratio of only 0.5 as there are two atoms of chlorine reacted for each molecule of charge stock. The mole equivalent ratio of hydrogen to the halogenated aromatic is suitably between 0.5:1 and 10:1 or more and is preferably between 1.5:1 and 4:1. Excellent results were obtained at an equivalent mole ratio of about 2:1. Impure hydrogen streams such as reformer off gas can suitably be used as long as the impurities in the hydrogen stream are inert in the reactors.

The liquid hourly space velocity of the halogenated aromatic is suitably between 0.1 to ten or more and is preferably between 0.4 and two.

The products from the subject reaction are in the vapor phase and are readily separated by condensation of the dehalogenated aromatic and recovery of substantially dry pure hydrogen halide corresponding to the halogen which has been removed from the aromatic nucleus. Any unconverted halogenated aromatic can easily be removed from the dehalogenated aromatic by simple distillation procedures. The invention will be further described with reference to the following experimental work.

In all of the experimental work, a 1 inch hot tube reactor was charged with 50 cc. of the desired catalyst. The top 10 inch section of the reactor was filled with Berl saddles to give a preheat section. The reactor was placed into a resistance furnace and maintained at a desired temperature. In each run the catalyst was pretreated by passing hydrogen over the catalyst at a temperature of 475° for two hours. The charge stock, which in most runs was 2-chloro-p-xylene, was passed downflow with hydrogen through the reactor at atmospheric pressure. The products were collected and analyzed by gas liquid chromatography.

EXAMPLE 1

In the run for this example, the catalyst was 0.6 weight percent platinum on an alumina base which had a surface area of about 359 square meters per gram. The catalyst was impregnated by the incipient wetness technique to deposit three weight percent potassium hydroxide based on the weight of the catalyst. Hydrogen and 2-chloro-p-xylene in a 2.3 molar ratio were charged downflow over the catalyst. The liquid hourly space velocity of the 2-chloro-p-xylene was 0.505. The product was analyzed every two hours and there was no noticeable change in conversion (98.1%) and selectivity (97.6%) to the desired p-xylene during a 32-hour period. Coke formation was only 0.011 weight percent of the charge. The results are summarized on Table I below.

EXAMPLE 2

Example 1 was repeated except the catalyst was not pretreated with potassium hydroxide and the run time was 4½ hours. The conversion was 93.3 percent, the selectivity to p-xylene 85.2 percent, and coke formation was 0.23 weight percent of charge. The results are summarized on Table I below.

TABLE I

| Example No. | 1 | 2 | 3 | 4 |
|---|---|---|---|---|
| Catalyst: | | | | |
| Metal | Pt | Pt | Pd | Pd |
| Wt. percent | 0.6 | 0.6 | 0.976 | 1 |
| Base | Al₂O₃ | Al₂O₃ | (¹) | Al₂O₃ |
| Wt. percent KOH | 3 | 0 | 5.8 | 0 |
| Charge stock: | | | | |
| 2-chloro-p-xylene, moles | 6.02 | 0.849 | 1.068 | 0.34 |
| Hydrogen, moles | 14.06 | 1.96 | 3.03 | 0.78 |
| Hydrogen/2-chloro-p-xylene, mole ratio | 2.3 | 2.3 | 2.8 | 2.3 |
| Reaction conditions: | | | | |
| L.H.S.V. | 0.505 | 0.5 | 0.48 | 0.46 |
| Throughput | 16.15 | 2.3 | 2.86 | 0.91 |
| Maximum temp., ° C | 257 | 255 | 260 | 255 |
| Products: | | | | |
| Benzene, mole | 0 | 0.012 | 0 | 0 |
| Toluene, mole | 0 | 0.085 | 0 | 0 |
| Xylene, moles | 5.708 | 0.648 | 0.988 | 0.249 |
| Dimethylcyclohexane, mole | 0.199 | | 0.081 | 0.086 |
| Trimethylbenzene, mole | 0 | 0.048 | 0 | 0 |
| 2-chloroxylene, mole | 0.169 | 0.047 | 0 | 0 |
| Tetramethylbenzene, mole | 0 | 0.006 | 0 | 0 |
| HCl, moles | 5.563 | 0.754 | 1.01 | 0.302 |
| Coke, wt. percent of charge | 0.011 | 0.23 | | |
| Wt. percent recovery | 98.4 | 98.2 | 98.2 | 98.8 |
| Yield, mole percent | 94.8 | 80.6 | 92.5 | 73.3 |
| Conversion, mole percent | 98.1 | 93.3 | 100.0 | 100.0 |
| Selectivity, mole percent | 97.6 | 85.2 | 92.5 | 73.3 |

¹ Silica-alumina.

Referring to Table I, a comparison of Examples 1 and 2 shows the addition of KOH results in better conversion and selectivities and much less coke formation even though the throughput was about eight times as high. The disproportionation was much greater with the untreated catalyst (Example 2) resulting, of course, in lowered yields and selectivities.

EXAMPLE 3

Example 1 was repeated except the catalyst was a 0.976 weight percent palladium on H-Zelon which is a 90 percent silica-10% alumina base having a surface area of 457 square meters per gram; the amount of KOH was increased to 5.8 weight percent; and the run time was six hours. Total conversion with over 90 percent selectivity to the desired product was obtained. The results are summarized on Table I above.

Referring to Table I, a comparison of Examples 1–3 shows both Pt (Example 1) and Pd (Example 3) catalysts which have been pretreated with KOH are superior to a Pt catalyst (Example 2) untreated with KOH with respect to conversion and selectivities.

EXAMPLE 4

Example 1 was repeated except the catalyst was a one weight percent palladium on an alumina having a surface area of about 90 square meters per gram and the run time was three hours. Total conversion was achieved but the selectivity to the desired product was greatly reduced to 73 percent. The results are summarized in Table I above.

Referring to Table I, a comparison of Example 4 with Example 3 shows a greatly reduced selectivity and yield of p-xylene by utilizing a catalyst unpretreated in accordance with the procedure of the invention.

EXAMPLE 5

Trichlorobenzene and hydrogen in a molar ratio of 1:5 and a liquid hourly space velocity of 0.2 was passed downflow at 250° C. and atmospheric pressure over the KOH treated 0.6 percent Pt catalyst used in Example 1. Analysis of the liquid product showed the trichlorobenzene was completely converted. About 70 percent of the product was chlorine free while the remaining 30 percent was a mixture of mono and dichlorobenzene.

EXAMPLE 6

Example 5 was repeated except fluorobenzene was used in place of trichlorobenzene, the hydrogen to fluorobenzene mole ratio was 1:1.3, and the liquid hourly space velocity was increased to 0.67. While decreased conversions were obtained due to the higher space velocities and lower hydrogen mole ratios, defluorination with the desired production of benzene was achieved.

Examples 5 and 6 show that various halogenated aromatics can be successfully dehalogenated by the method of this invention.

Resort may be had to such variations and modifications as fall within the spirit of the invention and the scope of the appended claims.

We claim:

1. A process which comprises contacting a halogenated aromatic in the vapor phase in the presence of molecular hydrogen with a catalyst comprising a minor amount of a hydrated alkali or alkaline earth metal oxide and a minor amount of a noble metal selected from the group consisting of platinum or palladium supported on a carrier.

2. A process according to claim 1 wherein the aromatic halide has the formula:

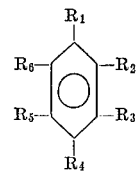

where $R_1$, $R_2$, $R_3$, $R_4$, $R_5$ and $R_6$ can be the same or different and are selected from the group consisting of hydrogen, halogen and saturated alkyl groups having from one to ten carbon atoms and wherein at least one of the R groups is halogen.

3. A process according to claim 1 wherein the catalyst carrier is one comprising alumina.

4. A process according to claim 1 wherein the amount of the hydrated metal oxide is between 0.25 and ten weight percent and the amount of the platinum and palladium is between 0.1 and ten weight percent of the catalyst.

5. A process according to claim 4 wherein the catalyst carrier has a surface area between about 200 and 500 square meters per gram.

6. A process according to claim 4 wherein the reaction temperature is between 175° C. and 450° C. and the mole equivalent ratio of hydrogen to the halogenated aromatic is between 0.5:1 and 10:1.

7. A process according to claim 1 wherein the hydrated alkali or alkaline metal oxide is deposited in the form of an aqueous solution of an alkali or alkaline earth metal hydroxide having the formula:

$$Me(OH)_y$$

where Me is lithium, sodium, potassium, cesium, rubidium, calcium, strontium or barium and $y$ is the valence of Me.

8. A process according to claim 7 wherein the metal hydroxide is potassium hydroxide deposited in an amount between two and seven weight percent of the catalyst.

9. A process according to claim 8 wherein the noble metal is platinum.

10. A process according to claim 8 wherein the noble metal is palladium.

11. A process in accordance with claim 1 wherein said oxide is an alkali metal oxide.

References Cited

UNITED STATES PATENTS 3,397,252 8/1968 Jones _____ 260—668
3,415,896 12/1968 Hay _____ 260—668

OTHER REFERENCES

Komarewsky et al., Technique of Organic Chemistry, vol. II, second ed., Interscience Publishers, Inc., New York, 1956; pp. 740–744.

CURTIS R. DAVIS, Primary Examiner

U.S. Cl. X.R.

260—650